INVENTORS
CLAUDIO SPERANDIO
EZIO MAZZOTTI

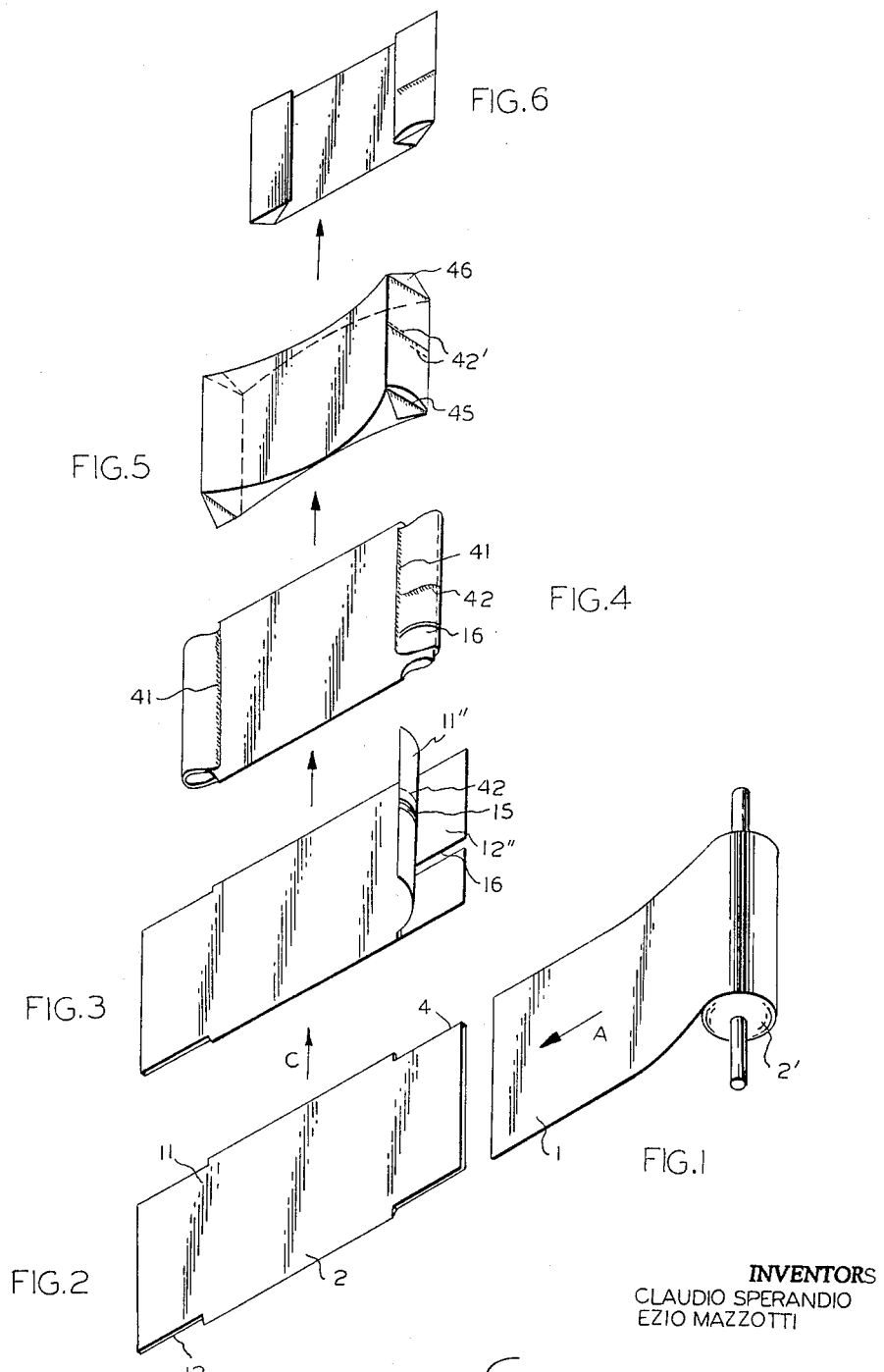

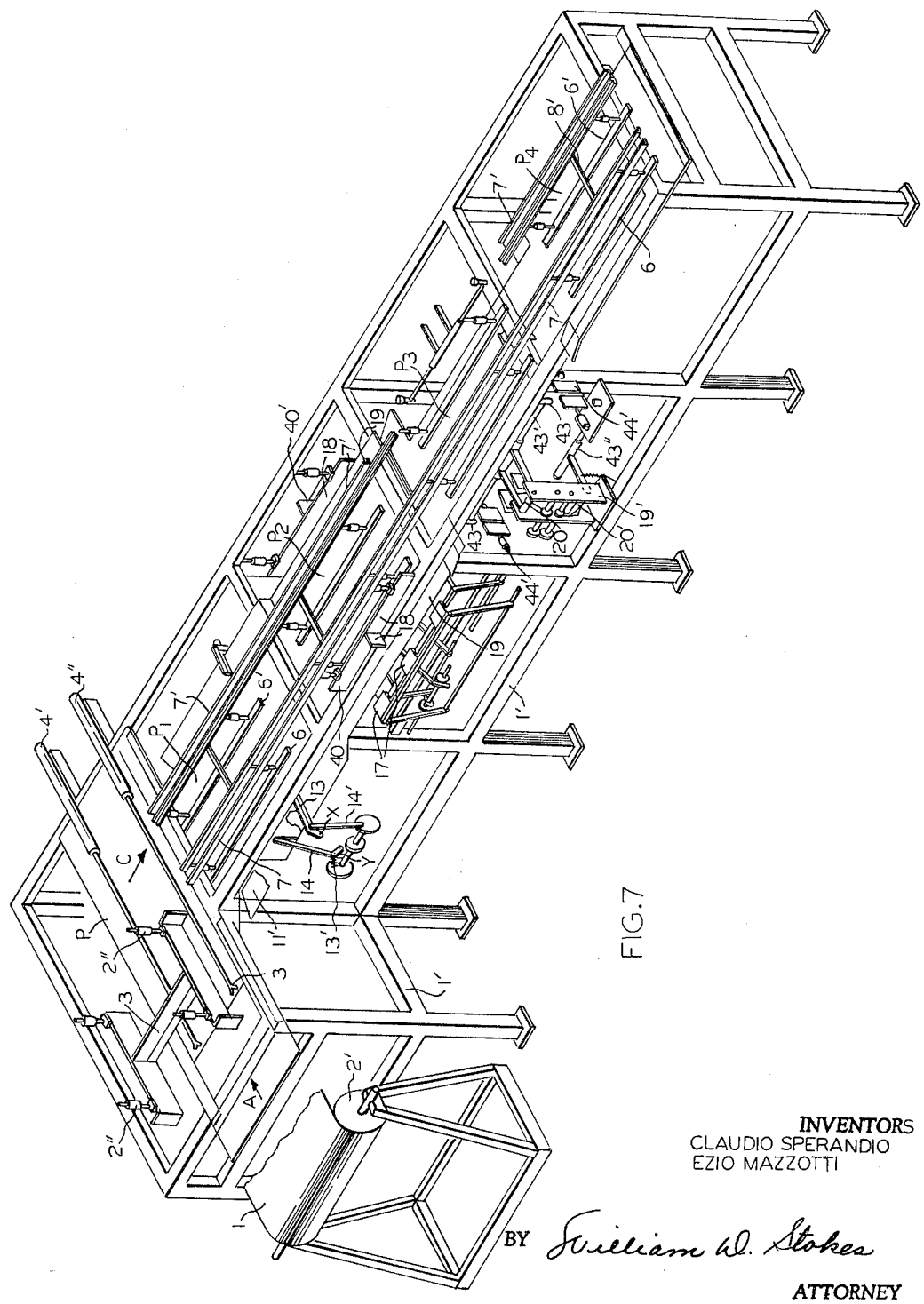

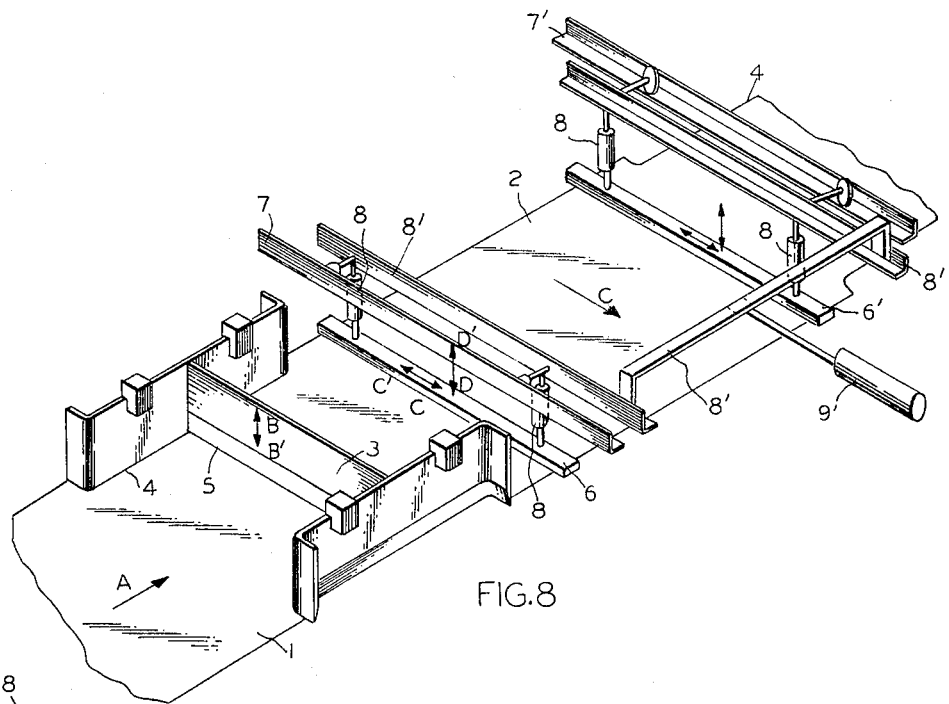
FIG. 8
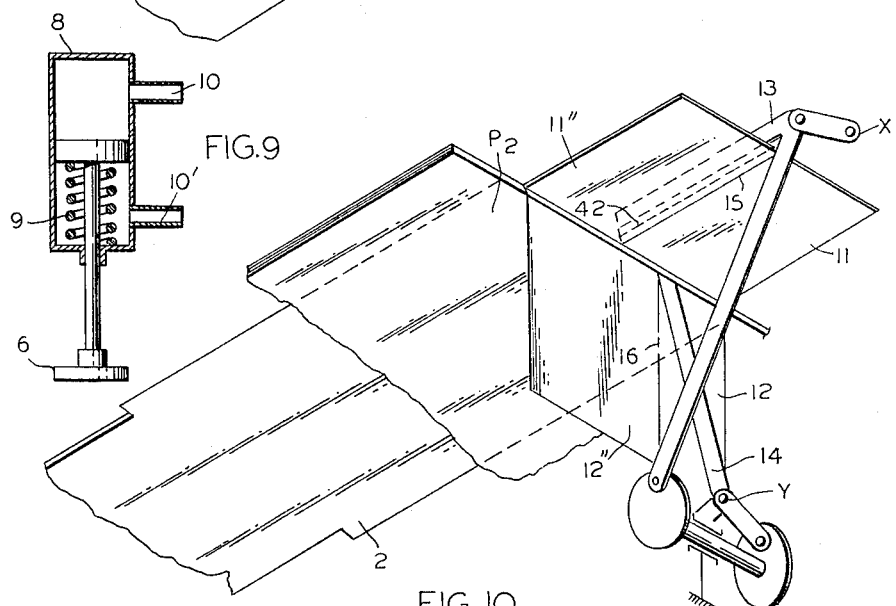
FIG. 9
FIG. 10
INVENTORS
CLAUDIO SPERANDIO
EZIO MAZZOTTI
BY *William A. Stokes*
ATTORNEY

BY *William W. Stokes*

ATTORNEY

United States Patent Office 3,282,174
Patented Nov. 1, 1966

3,282,174
EQUIPMENT FOR MAKING BAGS
Claudio Sperandio and Ezio Mazzotti, Mestre-Venezia, Italy, assignors to Edison, Milan, Italy, a corporation of Italy
Filed Nov. 27, 1963, Ser. No. 326,496
10 Claims. (Cl. 93—8)

This invention relates to equipment for continuous production of bags from lay-flat tubing of flexible material and particularly bags with squared off bottoms either with open end or provided with automatic closing valve.

More particularly, this invention is suitable for the automatic and continuous production of valved bags with substantially squared off bottoms suitable to be filled with a granular and/or powdery material, said bags being made of sheets of synthetic plastic material.

Several types of automatic machines are already known for the continuous production of paper bags or bags made of other suitable materials, with or without an automatic valve, and having a parallelepiped or cushion shape.

Such automatic machines cannot be used in the production of bags made entirely of synthetic plastic material because of the substantially different behaviour of the paper sheet compared to the synthetic plastic material sheet.

This invention provides equipment suitable for the continuous production of bags of plastic or flexible material. This equipment is, in general, capable of solving the problems arising out from the different physical properties of flexibility, rigidity, mechanical strength, pliability and the like, thus obviating those inconveniences which would be encountered when using the already known machines for paper bags.

This invention also reduces the "down times" for the passage of the bags from one production stage to another.

Moreover, an automatic closure valve of the tubular type can be readily provided simultaneously with manufacturing of the bags, without the need of preliminary preparatory operations for the valve itself.

One of the particular features of this invention lies in the fact that all the processing stages take place in synchronism with each other and in an automatic and continuous way, by means of electromechanical and/or hydraulic controlling devices of the known type and of easy application.

This invention consists in equipment for the continuous production of bags from lay-flat tubing of flexible material comprising: means for unwinding the lay-flat tubing from a reel and feeding it on to a work plane; means for cutting the tubing into flattened portions each with a pair of free flaps at least at one end; means for folding the free flaps one over another and welding them to form the bottom of the bag at another working plane; means for opening out the bag at its welded end at a further work plane; means for welding the ends of the opened out bag bottom to give a weld at right angles to the bottom weld at this further plane; and means for shifting the flattened portions from one work plane to another.

Preferably a work plane is provided between the cutting of the tube into flattened portions and folding and welding of the flaps into the bag bottom, wherein cutting means are provided at this work plane to cut a longitudinal slit in each free flap in such a position as to form an inlet valve in the folded bottom.

The means for cutting the tubing into flattened portions may be a vertically reciprocable blade so shaped as to cut off a narrow portion along the sides of the flattened portion at one end at least of the flattened portion to define free flaps.

In this case, it is preferred for this cutting means to be an H-shaped blade narrower than the lay-flat tubing, the limbs of the H being extended outwards to the edges of the tubing at each end. Alternatively, the blade may be shaped as two elongated letters C back to back with their limbs reaching the edges of the tubing, in which case rotating knives are preferably provided to cut the tubing into portions.

If the flaps are to be cut to form a valve, preferably means are provided to separate the flaps and rotating knives are provided to cut the longitudinal slits in the flaps thus separated.

In an especially preferred embodiment the means for shifting the flattened portions from one work plane to another consist of at least one frame movable with a reciprocating motion, and mounted on rails extending over all the work planes, said movable frame being provided with gripping means having pneumatic controls for shifting the flattened tube portions.

To turn now to the folding means this is preferably a system of spring-blased levers actuated by cams on a common camshaft and each carrying guide members successively to fold the flaps over a welding counter electrode and one another in a predetermined sequence.

As far as welding is concerned it is preferred that the means for welding the flaps, and the ends of the opened-out bag bottom consist of pairs of electrodes movable to a position on opposite sides of the eventual weld. In this latter case, the pairs of electrodes which weld the ends of the opened out bag bottom may be provided with sharp edges to cut off waste material.

When, as is particularly envisaged, a valve is to be formed, it is possible that opposed electrodes welding the bottom of the bag to define, with the longitudinal slits, a valve opening are staggered with regard to each other so as to give two parallel welds staggered one to the other and thus a double-entry valve.

Preferably, means for opening out the bag at its welded ends consist of a tube, from which air can be exhausted to draw in a portion of the bag, having within it pneumatically operable jaws to grip that portion.

The invention further consists in bags made on the above equipment.

The invention will now be described in a non-limiting preferred embodiment with reference to the accompanying drawings, in which:

FIGURE 1 shows flattened synthetic plastic tube unwinding from a coil;

FIGURE 2 shows a portion of such a flattened tube in the first processing stage;

FIGURES 3, 4, 5 show the same portion in subsequent processing stages;

FIGURE 6 shows in a perspective view a valved bag obtaining with the equipment according to this invention;

FIGURE 7 is a general perspective view of automatic equipment for the production of valved bags as illustrated in FIGURES 1 to 6;

FIGURES 8 and 9 show schematically that part of the equipment which produces the portion of flattened tube as illustrated in FIGURE 2;

FIGURE 10 shows schematically from below, that part of the equipment of FIGURE 7 which produces the portion of flattened tube as illustrated by FIGURE 3;

Figure 11:
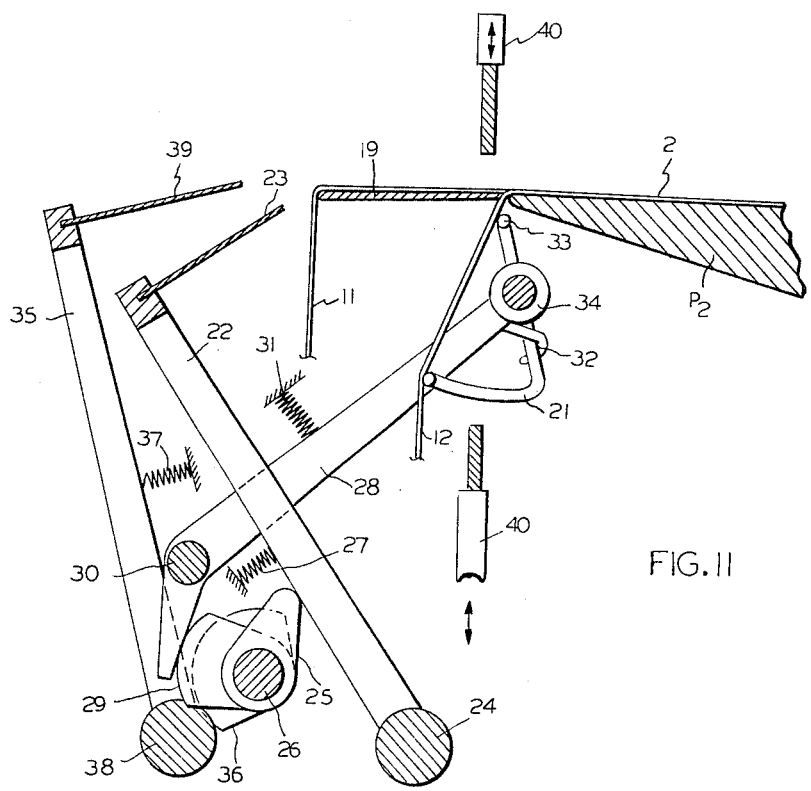
FIGURES 11, 12 and 13 show schematically that part of the equipment of FIGURE 7 which in subsequent stages produces the portion of flattened tube illustrated in FIGURE 4.

With reference to the above figures, and particularly with regard to the general perspective view of FIGURE 7, the equipment of the present invention consists of a number of working stations, situated on a supporting frame 1', for progressively and automatically bringing about the various operational stages shown in FIGURES 1 to 6.

At one end of the supporting frame 1' is placed a reel 2' of a flattened synthetic plastic tube 1.

A blade 3, liftable and lowerable by means of pneumatic pistons 2" and shaped like an H (see FIGURE 7) is provided above working plane P to cut out the portion of flattened tube 2 as shown in FIGURE 2.

Two nippers 3' and 3" which are movable to and fro by pneumatic pistons 4' and 4" to drag a portion of flattened tube 2 along plane P.

Working planes $P_1$, $P_2$, $P_3$ and $P_4$ constitute the working stations for the execution of the stages illustrated in FIGURES 3 to 6. Parallel rails 7 and 7' extend over the whole length of planes $P_1$, $P_2$, $P_3$ and $P_4$ and across the width of plane P (although this is not shown). A rectangular frame of metal profiles indicated generally as 8' and of the same length as planes $P_1$, $P_2$, $P_3$ and $P_4$, is mounted so as to roll on rollers along guide rails 7 and 7'. Frame 8' is reciprocable by pneumatic piston 9' (FIGURE 8) connected to the end crosspiece of this moving frame 8'. Frame 8' moves to and fro with a travel equal to the width of a working plane so as to carry portion of flattened tube 2 from one station to the other and to continuously and automatically feed all working stations.

FIGURE 8 shows frame 8' about to transfer flattened tube portion 2 from plane P to plane $P_1$ in the direction of arrow C. Cross-members 6 and 6' which are connected to the mobile frame 8' by means of pneumatic pistons 8 (which act to raise or lower them) form pressing means for dragging the flattened tube portion 2 from one working plane to the next.

Similar cross-members 6 and 6' are provided at each stage, although to simplify the drawing they are not all shown in FIGURE 7.

The pneumatic piston 8 is shown in more detail in FIGURE 9, and has an inlet 10 and an outlet 10' for compressed air and a return spring 9.

PLANE $P_1$

Knives 13 and 14 acting in planes at 90° to each other and driven by a system of rods 13' and 14' (see FIGURE 7 and FIGURE 10) are provided at the working plane $P_1$ to make cuts 15 and 16 in the two flaps 11 and 12 at one end of the flatted tube portion 2 after it has been moved in the direction of arrow C from plane P.

The flaps 11 and 12 are spread open by inclinated planes 11' so as to arrange them as shown in FIGURE 10. Sucking cup-like organs (not shown) may be provided to facilitate the entry of plane 11' between flaps 11 and 12.

FIGURE 10 shows (from underneath the plane) the position of knives 13 and 14 on flaps 11 and 12 arranged at 90° to one another.

PLANE $P_2$

The folding and overlapping of flaps 11 and 12 and the welding of the bottom, in order to carry out the phase shown in FIGURE 4 is carried out at plane $P_2$.

At both sides of plane $P_2$ are provided a system of folding devices generally indicated by 17 together with a system of opposed welding electrodes generally indicated by 18. 19 is a fixed counterelectrode from which the already welded bottom of the bag is eventually stripped off.

The construction details of the system 17 and 18 will be described below when the operation of the whole equipment is described, with reference to FIGURES 11, 12 and 13.

PLANE $P_3$

On plane $P_3$ the opening operation of the transversally welded bottom and the final welding of the corners of the bottoms (that is the stage represented in FIGURE 5) is effected.

Figure 15:
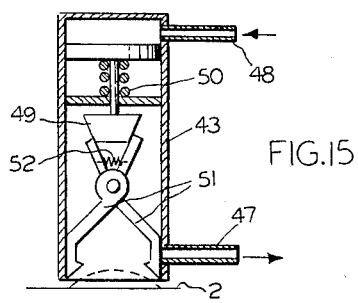
FIGURE 15 shows schematically a particular embodiment of a pneumatic nipper device represented in FIGURE 7 for spreading the tubular ends.
Figure 14:
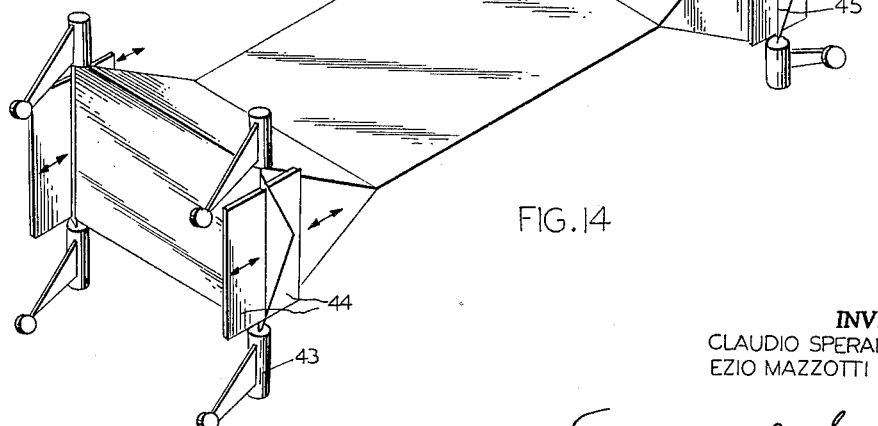
FIGURE 14 shows schematically that part of the equipment of FIGURE 7 that produces the finished bag.

The bottom opening devices consist of four pairs of pneumatically operated jaws 42 (FIGURES 7, 14 and 15).

FIGURE 15 represents schematically one of the pneumatic jaws 43. These jaws are caused to adhere to the flattened tube portion 2 at suitable positions. A vacuum is applied through duct 47 and a little of the sheet 2 is sucked in as shown by the dotted line on FIGURE 15. At this stage compressed air is blow in through duct 48 thereby forcing a truncated cone 49 between the arms of jaws 51 which jaws thus close and catch the film, overcoming the opposing spring 52. The jaws are then lifted upwards thereby opening the flattened tube portion.

On removing the compressed air the return spring 50 opens the jaws 51 thereby freeing the finished bag.

Each pair of jaws is supported on two horizontal rods 43' and 43" which are movable towards each other through a system of levers 20 and 20' driven by a cam-controlled motion supported on the frame 19'. The four pairs of welding electrodes 44 for executing welding 45 (FIGURE 5) are supported by the framework 1' and are operated by pneumatic pistons 44' (see also FIGURE 14). The finished bag is automatically moved again by cross-pieces 6 and 6' on to plane $P_4$.

The equipment is provided with control means of known type and not shown for regulating on one hand the feeding speed of the mobile frame 8' (and therefore of the flattened tube portion on to the working planes) and on the other hand the motion of the cutting and welding devices, so that the shaping operation takes place in perfect synchronism with the other working stages, eliminating down times.

The equipment operates as follows:

The continuous flattened tube 1, which is fed in the direction of arrow A by nippers 3' and 3" (FIGURES 1, 7–8), is shaped in this first working stage $P_1$ by means of blade 3 so as to form the flattened tube portion 2 represented in FIGURE 2. This shaping operation may be accomplished in one single phase by means of an H-shaped blade 3, as shown in FIGURES 7 and 8, moving up and down as indicated by arrows B and B'. This blade effects simultaneously the longitudinal cuts 4 and the transverse cut 5. Cuts are made with cutting edges substantially like an elongated letter C as shown in FIGURE 8.

This avoids sharp corners so as to avoid weaknesses arising from the execution of slits 1 along the flattening lines of the portion of tube, since these would facilitate the tearing of the bag when the ends are opened as described below.

In a modified embodiment (not shown) the shaping operation of the flattened tube portion 2 can be executed in two successive stages for instance by making first the cuts 4 along the flattening lines of the tube by means of a blade shaped as two elongated letters C back to back and subsequently effecting the transverse cut of the tubular web by cutting means which may be of the punch, guilletine or rotating knife type.

Furthermore, the H- or double-C-shaped blade 3 may have variable dimensions (e.g. be fitted with an expansion and contraction system) so as to be adjustable depending on the width of the film. Then it is not necessary to replace the blade when the dimensions are to be changed.

Flattened tube portion 2 is displaced from plane P to plane $P_1$ in the direction of arrow C at substantially 90° to the motion of the flattened tube portion on plane P. This displacement is accomplished by the two cross-pieces 6 and 6' on the mobile frame 8' movable on the two guide rails 7 and 7'. Pistons 8, which are pneumatically controlled, lower the cross-pieces 6 and 6' in the direction of the arrow D so that they entrain by friction the flattened tube portion 2 in the direction of arrow C onto the working plane $P_1$ for the next stage. When the compressed air is removed the return springs 9 (FIGURE 9) lift the cross-piece 6 and 6' upwards in the direction of arrow D', thereby lifting the flattened tube portion 2. The cross-pieces are then brought back to the original position by mobile frame 8' moving in the direction of arrow C' and thus become ready for a new cycle.

Flattened tube portion 2 arrives on work-plane $P_1$, with the free flaps 11 and 12 divaricated as in FIGURE 10 by means of the divaricator i.e. inclinated planes 11' (FIGURE 7). The free flaps 11 and 12 (FIGURE 2) are then suitably slit by knives 13 and 14 rotating around the axes $x$ and $y$ respectively and driven by link-works coupled to motor drives (not represented herein); these slits, marked 15 and 16 in FIGURE 3 and 10, are parallel to the folding lines of the flattened tube portion, are staggered with respect to each other, and are each applied to only one flap of at least one of the two pairs of free flaps of the flattened tube portion 2. Slit 15 will become the slot of the tubular valve through which material eventually enters the bag, while slit 16 will become the valve input.

The stage illustrated in FIGURE 10 will not be used if open-mouth bags are to be produced. The flattened tube portion passes then to a subsequent working stage on plane $P_2$ where the folding and overlapping of the flaps 11 and 12 which will form the bottoms are accomplished.

Figure 12:
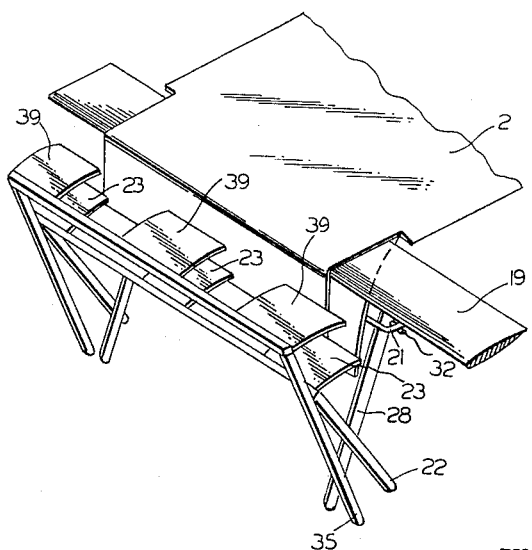

FIGURES 11 and 12 represent the device which does this. The flattened tube portion 2 arrives on the working plane $P_2$ through the agency of mobile frame 8' and relative cross-pieces 6 and 6' as before; flap 11 rests on plane 19 (the counter-electrode) suitably shaped so as to prevent the walls of the flattened tube portion welding together during the welding stage which will be described further on, and flap 12 hangs downwardly against the arched folding member 21.

Lever 22 with its presser elements 23 on rotating around the axis 24 following the action of cam 25 rotating clockwise with shaft 26, folds flap 11 under the counter-electrode 19 (FIGURES 11 and 12); this rotation of lever 22 is opposed by the return spring 27. Lever 28, when disengaged from the cam 29, rotates counter-clockwise around axis 30 due to the action of the spring 31 and lifts the operative end of folding member 21, which rotates around axis 33 due to the force exerted by the hook 32 which is fixed on lever 28. Folding member 21 then lifts the flap 12 and laps it over the already folded flap 11, while rubber rollers 34 keep both of the overlapped flaps 11 and 12 pressed against the lower face of the counter-electrode 19 (without interfering with presser elements 23, which are staggered with respect to the rubber rollers, as can be seen from FIGURE 12).

As soon as flap 11 is pressed up under the counter-electrode by the rubber rollers 34, as distinct from the presser elements 23, lever 22 returns to its resting position by the spring action of 27. Thereupon lever 35, disengaged from cam 36, is attracted by spring 37 and rotates clockwise about axis 38. By means of its presser elements 39 it then causes the end of flap 12 to be folded over onto the upper part of the counter-electrode 19.

Springs 27, 31 and 37 each have their other end fixed to the fixed part of frame 1'.

The cams on shaft 26 controlling the different levers have suitable profiles which determine the successive movements of the levers in strict synchronism with each other and the shaft 26 on which said cams are mounted is power driven by a motor not shown in the drawing.

Without departing from the scope of this invention, the above mechanism may be replaced by other equivalent devices.

Figure 13:
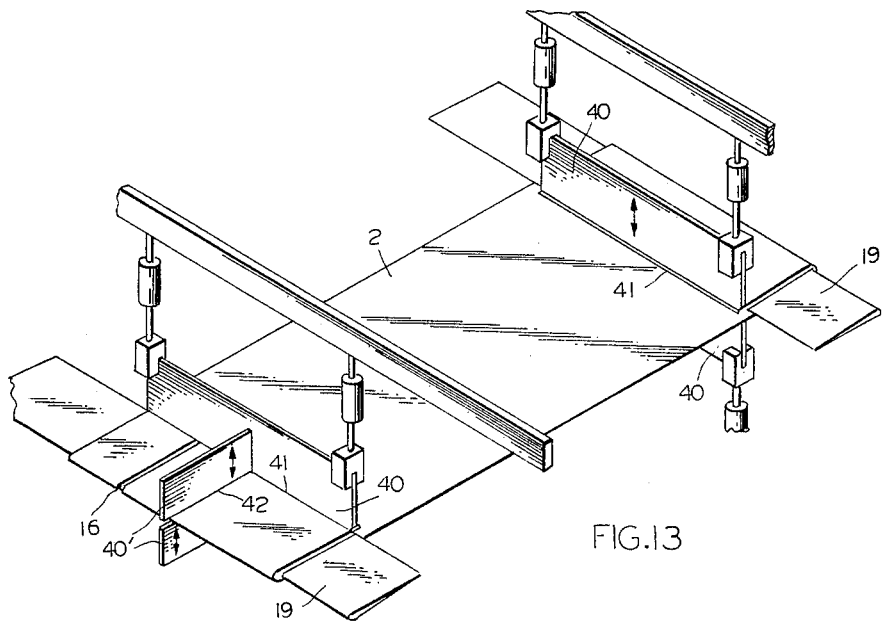

When the flaps have been folded they must be welded, as shown in FIGURES 7 and 13.

Whilst the folding mechanisms are moving back to start a new cycle, the electrodes 40 and 40' are brought into contact with the flattened tube portion both at the upper and the lower face accomplishing both the cross-weldings 41 (FIGURE 4) (fastening the ends of the free flaps each to the opposite wall of the tubular section) and the longitudinal welding 42 fastening flap 11'' to flap 12'' (see FIGURE 3) so as to form the slot through which the material enters the bag, thus avoiding the formation of an obstructing pocket or of a hindrance for the bag filling nozzle. The metal plate of the counter-electrode 19 prevents the welding together of the opposite walls of the tubular section during the welding of the overlapping flaps 11 and 12, 11'' and 12''. The electrodes 40 and 40' are controlled by pneumatic pistons of the type described for the control of cross-pieces 6 and 6'.

In a modified embodiment, which falls within the scope of the invention, the superposed electrodes 40' may be staggered among themselves so as to achieve two longitudinal, parallel and staggered weldings (schematically represented by 42' in FIGURE 5), each on one edge of the slit 15, so as to form a double-entry valve.

Flattened tube portion 2 then passes on to plane $P_3$ for the final processing stage represented by FIGURE 14, in which the flattened tube portion is spread open at both ends by means of the pneumatic jaws 43 already described previously.

The tube portion thus opened out is welded at its ends perpendicularly to weldings 41 by means of the four pairs of electrodes and counterelectrodes 44 (FIGURES 7 and 14) executing the weldings 45. This forms the cross bottoms which give the bag a parallelepiped shape shown in FIGURE 5.

These four pairs of electrodes and counterelectrodes 44 also act as knives to cut off the triangular ears 46 of excess material (see FIGURE 6). It is to be noted that due to the slit 16, the welding 45 does not involve the strip 12'' which thus forms the inlet of the automatic valve.

The equipment according to this invention may be also used for the continuous production of multilayer bags, with or without valve.

Various modifications may be made without departing from the scope of this invention as defined in the appended claims.

We claim:

1. Equipment for the continuous production of bags from lay-flat tubing of flexible material, preferably of the type having squared bottoms with or without automatically closing valve, comprising means for the unwinding the lay-flat tubing from a reel, means for feeding said lay-flat tubing on to a work plane on which, including cutting means, said tubing is cut up into tubular sections and slit along at least one of its ends for a certain length preferably along the flattening lines, so as to form at least one pair of free overlapping flaps, dragging means for shifting said shaped tubular section on another work plane means for spreading said flaps; cutting means, preferably with rotating knives, which carry out the longitudinal cuts in an offset disposition and at least one on each flap of at least one of the pairs of free flaps, means for effecting on another work plane the superimposition of the free flaps, consisting of a system of guiding elements, preferably a system of levers, means for the simultaneous welding on another plane of the flaps thus superimposed to form the bottoms and the filling valve, means for spreading open the tubular section at its ends on another work plane as well as means for the simultaneous welding of the lateral edges of the bottoms for their sealing and for the formation of the squared bottoms, and finally a mobile frame for shifting each flattened portion from one work plane to another.

2. Equipment according to claim 1, in which said means for unwinding the lay-flat tubing from the reel and for its feeding to the work planes, consist of at least one frame movable with a reciprocating motion and provided with gripping means for the dragging off of the tubular section, this mobile frame and gripping organs being subjected to pneumatic controls for accomplishing the translation motion of the tubular section.

3. Equipment according to claim 1 characterized in that said cutting members for cutting the lay-flat tubing into sections and for slitting these up for a certain stretch along the flattening lines, consists of at least one H-shaped blade having the wings curved substantially as a letter C and preferably with rounded off corners.

4. Equipment according to claim 3 in which said cutting members for slitting up the tubular section for a certain length along the flattening lines consist of at least one blade with cutting edges shaped substantially as a double C with preferably rounded off corners.

5. Equipment according to claim 1 in which said cutting means substantially provided with a rotating knife and suitable for accomplishing the longitudinal set off slits, consists of sharp blades having a reciprocating motion and disposed on different planes for the execution of said staggered slits on the free flaps.

6. Equipment according to claim 1 in which said welding means of both the overlapping flaps and the edges of the bottoms consist of double electrodes substantially superimposed to each other.

7. Equipment according to claim 1, wherein the superimposed electrodes accomplishing the bottom weld of the valve are preferably offset with regard to each other so as to effect two parallel welds offset one to the other.

8. Equipment according to claim 6 wherein said pairs of electrodes which accomplish the closing of the bottoms are preferably provided with sharp edges to cut off waste material.

9. Equipment according to claim 1 in which said folding means for folding the free flaps over one another consist of a system of levers independently driven by a camshaft and each carrying guide members at the free end, said levers with said guide members being subjected to the action of return springs and having a reciprocating motion to fold the flaps over a welding counter-electrode and on another in a predetermined sequence.

10. Equipment according to claim 1 wherein said spread-open devices for the opening up of the ends of the tubular section consist of pneumatic nippers controlled by springs and contained on a tube from which air can be exhausted to draw in a portion of the bag, said nippers having pneumatically operable jaws to grip that portion.

No references cited.

BERNARD STICKNEY, *Primary Examiner.*